United States Patent
Berg et al.

(10) Patent No.: US 9,650,695 B2
(45) Date of Patent: May 16, 2017

(54) METHOD FOR TREATING LEAD ANODE SLIME

(71) Applicant: OUTOTEC (FINLAND) OY, Espoo (FI)

(72) Inventors: Gunnar Berg, Skellefteå (SE); Mikhail Maliarik, Skellefteå (SE); Bert Ögren, Ursvilken (SE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/038,198

(22) PCT Filed: Nov. 19, 2014

(86) PCT No.: PCT/FI2014/050885
§ 371 (c)(1),
(2) Date: May 20, 2016

(87) PCT Pub. No.: WO2015/075312
PCT Pub. Date: May 28, 2015

(65) Prior Publication Data
US 2016/0281193 A1    Sep. 29, 2016

(30) Foreign Application Priority Data

Nov. 21, 2013 (FI) .................................. 20136164

(51) Int. Cl.
  *C22B 30/04*    (2006.01)
  *C22B 30/02*    (2006.01)
  (Continued)

(52) U.S. Cl.
  CPC ............... *C22B 30/04* (2013.01); *C01B 7/20* (2013.01); *C01G 28/007* (2013.01); *C22B 7/001* (2013.01);
  (Continued)

(58) Field of Classification Search
CPC ......... C22B 30/04; C22B 30/02; C22B 7/001; C22B 13/06; C22B 13/025; C01B 7/20; C01G 28/007
See application file for complete search history.

(56) References Cited

U.S. PATENT DOCUMENTS 4,138,231 A    2/1979 Hedenäs et al.
4,489,046 A * 12/1984 Petersson ............. C01G 28/005
                                                   423/88
(Continued)

FOREIGN PATENT DOCUMENTS

| AT | 57432 B |   | 1/1913 |   |
|----|---------|---|--------|---|
| CN | 1800423 A | * | 7/2006 |   |
| CN | 202099361 U |  | 1/2012 |   |
| CN | 103397191 A | * | 11/2013 |   |
| GB | 191125179 A | * | 0/1912 | ............. C22B 7/001 |
| GB | 253908 A | * | 9/1927 | ............... C25C 1/24 |

OTHER PUBLICATIONS

CN 103397191 A published Nov. 2013. Machine translation.*
(Continued)

*Primary Examiner* — George Wyszomierski
*Assistant Examiner* — Tima M McGuthry Banks
(74) *Attorney, Agent, or Firm* — Robert P. Michal, Esq.; Carter, DeLuca, Farrell & Schmidt, LLP

(57) ABSTRACT

The present invention relates to a method of treating lead anode slime having high fluorine and arsenic content, in particular to a method comprising smelting of the lead anode slime and cleaning the produced off gases in a one or more wet gas cleaning stages.

13 Claims, 3 Drawing Sheets

(51) Int. Cl.
  *C22B 13/06* (2006.01)
  *C01B 7/20* (2006.01)
  *C01G 28/00* (2006.01)
  *C22B 7/00* (2006.01)
  *C22B 13/02* (2006.01)

(52) U.S. Cl.
  CPC ............ *C22B 13/025* (2013.01); *C22B 13/06* (2013.01); *C22B 30/02* (2013.01)

(56) References Cited

U.S. PATENT DOCUMENTS 4,581,064 A   4/1986   Morrison et al.
4,588,564 A   5/1986   Kohno et al.

OTHER PUBLICATIONS

CN 1800423 A published Jul. 2006. Machine translation.*
Written Opinion of the International Searching Authority issued by the European Patent Office in relation to International Application No. PCT/FI2014/050885 dated Apr. 23, 2015 (4 pages).
James E. Hoffmann, "The World's Most Complex Metallurgy Revisted", World of Metallurgy—Erzmetall 61 (2008) No. 1, pp. 6-13.
Bjorn M. Ludvigsson et al., "Anode Slimes Treatment: The Boliden Experience," Industrial Insight Previous Metals: Pyrometallurgy, Apr. 2003, vol. 55, No. 4, JOM pp. 41-44.
International Search Report PCT/FI2014/050885 Apr. 23, 2015 (3 pages).

* cited by examiner

METHOD FOR TREATING LEAD ANODE SLIME

CROSS-REFERENCE TO RELATED APPLICATIONS

This application is a National Phase Entry under 35 USC §371 of PCT Patent Application Serial No. PCT/FI2014/050885 filed Nov. 19, 2014, which claims the benefit under 35 USC §119(e) to Finnish Patent Application No. 20136164, filed Nov. 21, 2013, the disclosure of each of these applications are expressly incorporated herein by reference in their entireties.

FIELD OF THE INVENTION

The present invention relates to a method of treating lead anode slime having high fluorine and arsenic content, in particular to a method comprising smelting of the lead anode slime and cleaning the produced off gases in a one or more wet gas cleaning stages.

BACKGROUND OF THE INVENTION

Conventionally lead anode slime (Pb AS) is treated in a series of process steps using at least two furnaces connected to dry gas cleaning systems. During this process toxic flue dust high in arsenic and antimony is produced and which has to be treated further in order to recover or remove antimony. For example U.S. Pat. No. 4,558,564 discloses a process for recovering arsenic from scrubbing water used to scrub the flue gas of sulphide ore smelting and CN202099361U discloses a method where flue gas containing arsenic is directed to two-stage venturi scrubber washing.

BRIEF DESCRIPTION OF THE INVENTION

It is thus an object of the present invention to provide a method so as to overcome the above problems. The objects of the invention are achieved by a method which is characterized by what is stated in the independent claim. The preferred embodiments of the invention are disclosed in the dependent claims.

The invention is based on the idea of treating corrosive process gas having high content of fluorine and arsenic in a separate wet gas cleaning step and precipitation of the arsenic and fluorine compounds from the recycling venturi solution in order to render the venturi solution less corrosive and reduce the quantity of the solution sent to waste water treatment. This allows the treatment of the lead anode slime using a single smelting furnace. Further, product generated by the wet gas cleaning step(s) of the method of the invention are less harmful to the environment compared the flue dusts generated by the dry gas systems.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
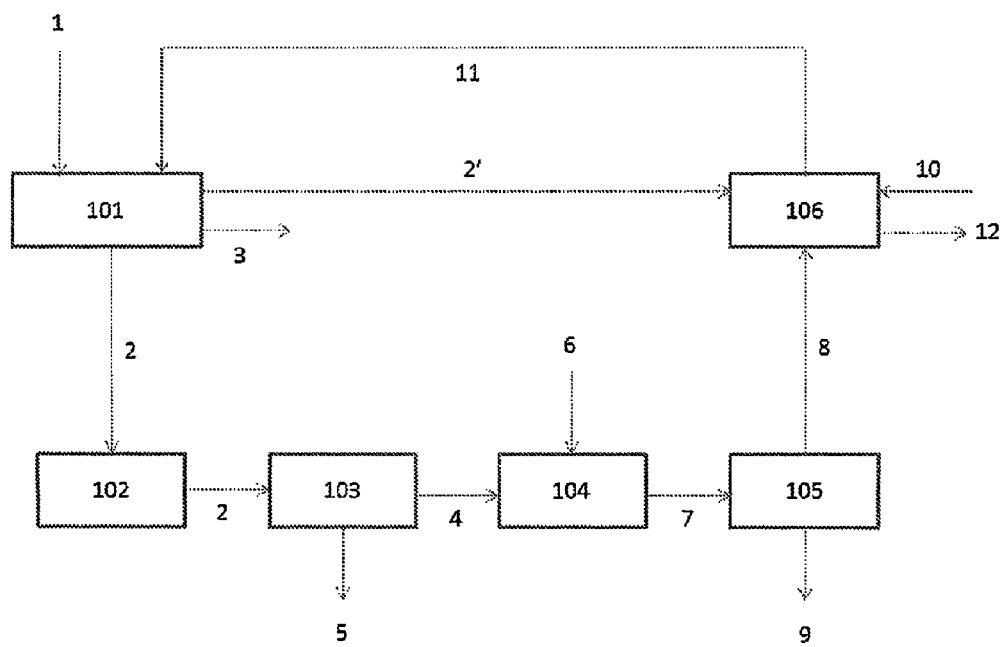
FIG. 1 shows a flow diagram of an example a first cleaning stage comprising steps (c) to (f) of the method of the present invention.

The present invention relates to a method of treating lead anode slime, comprising the steps of:
(a) providing a feed mixture comprising lead anode slime;
(b) smelting the feed mixture in a smelting furnace at a temperature above 1000° C. to smelt the feed mixture and to volatized and remove at least part of antimony (Sb), fluoride (F) and arsenic (As) comprised in the feed mixture to obtain a first metal phase, a Pb slag and first process gas comprising volatilized Sb, F and As;
(c) cleaning the obtained first process gas in a venturi scrubber by contacting the said first process gas and a first venturi solution in the venturi scrubber to remove at least part of the Sb, F and As from the said first process gas to obtain a first cleaned process gas at least partly depleted of Sb, F and As and a second venturi solution comprising removed part of Sb, F and As;
(d) filtering at least part of the obtained second venturi solution to obtain a first venturi slime comprising Sb and a third venturi solution comprising F and As;
(e) adding a precipitation agent to the third venturi solution to precipitate at least part of F and As and filtering the thus obtained mixture to obtain a fourth venturi solution at least partly depleted of F and As and a F/As precipitate; and
(f) recycling the obtained fourth venturi solution to step (c) as a part of the first venturi solution.

The high content of F and As compounds in the third venturi solution renders the venturi solution corrosive. Addition of the precipitation agent to the third venturi solution neutralizes the said venturi solution and makes it less corrosive. The addition of the precipitation agent can be accomplished in a separate precipitation tank. The resulting F/As precipitate can then be filtered off, preferably this is done continuously.

Furthermore, the precipitation of at least part of the F and As in step (e) makes it possible to decrease the volume of the solution in the venturi system and consequently the volume of solution to be treated later in the waste water treatment as the final filtrate from the filtering step (d) goes to the waste water treatment. The precipitation process can be controlled by pH measurement. By filtering of the resulting precipitate, the risk of formation of hard layers of same precipitation products in the venturi system and its pipes is minimized.

In an advantageous example of the method of the present invention the precipitation agent in step (e) is CaO, $Ca(OH)_2$, $CaCO_3$ or a mixture thereof, preferably CaO. This results in the precipitation of $Ca(AsO_2)_2$ and $CaF_2$. Calcium forms stable products with F and As at certain pH.

The method of the present invention may further comprise the steps of: (g) subjecting the first metal phase obtained in step (b) to oxidizing conditions to oxide, volatize and remove at least part of the remaining Sb, F and As and at least part of Pb comprised in the first metal phase to obtain a second metal phase, a first converting slag comprising Sb and Pb, and a second process gas comprising volatized Sb, F, As and Pb; and (h) introducing the obtained second process gas to the cleaning step (c).

Advantageously step (g) is accomplished by exposing the first metal phase to air. Preferably this is done by blowing air through a steel lance on the surface of the first metal phase.

FIG. 1 illustrates an example of a first cleaning stage, comprising the steps c to f of the method of the present invention, wherein a first combined process gas (1) comprising high amounts of F and As, and consisting of a first process gas produced in a smelting step (a) and, optionally, a second process gas produced in a oxidizing step (g) as discussed above, is introduced into a first venturi gas cleaning step (101) wherein the first combined process gas (1) is scrubbed by contacting it with a first venturi solution (11) in a venturi scrubber. The first combined process gas (1) is preferably first quenched with the first venturi solution (11) in a quencher before introduction into the gas scrubber.

The venturi scrubber can be complemented with a droplet separator to remove the fine liquid droplets generated by the venturi gas induced liquid atomization. The first venturi solution (11) may comprise low amounts of F and As as discussed above. The first venturi gas cleaning step (101) provides a first cleaned process gas (3) at least partly depleted of Sb, F and As and a second venturi solution (2) comprising removed part of Sb, F and As which can be collected in a first holding tank (102).

As can be seen in FIG. 1 at least part the second venturi solution (2) from the first venturi gas cleaning step is filtered (103), preferably continuously, in order to remove the solid particles comprising Sb and Pb, if present. The F and As are still dissolved. Thus a first venturi slime (5) comprising Sb and a third venturi solution (4) comprising F and As are obtained. The third venturi solution (4) is then transported to a precipitation tank (104) where a suitable precipitation agent (6) (e.g. CaO) is added. The resulting reaction will generate solid particles of F and As compounds (e.g. $CaF_2$, $Ca(AsO_2)_2$) (9) which are continuously filtered (105) off from the thus obtained venturi solution mixture and a fourth venturi solution (8) at least partly depleted of F and As and a F/As precipitate which typically recovered as a F/As filter cake (9). The fourth venturi solution (8) is almost free from F and As. It can be collected in a first circulation tank (106) where it can be mixed with further venturi solutions (10) utilized and produced elsewhere in the process. From the first circulation tank (106) the combined venturi solutions are pumped back to the quencher and the venturi throat as the first venturi solution (11). At the end of the first cleaning stage the combined venturi solutions collected in the first circulation tank (106) can be sent to waste water treatment (12). After complete first cleaning stage the circulation is switched over from (106) to (104) and the second venturi solution (2') and the combined venturi solutions are then transferred to waste water treatment (12) via (106).

The method of the present invention may still further comprise the step of: (i) subjecting the second metal phase obtained in step (g) to oxidizing conditions to oxide, volatilize and remove at least part of the remaining Sb, F, and As, and at least part of Pb comprised in the second metal phase to obtain a third metal phase, a second converting slag comprising Bi and a third process gas comprising volatized Sb, F, As and Pb; (j) cleaning the obtained third process gas in a venturi scrubber by contacting the said third process gas and a fifth venturi solution in the venturi scrubber to remove at least part of the Sb, F and As from the said process gas and to obtain a second cleaned process gas at least partly depleted of Sb, F and As and a sixth venturi solution comprising Sb, F and As; and (k) filtering part of the obtained sixth venturi solution to obtain a second venturi slime comprising Sb, and a seventh venturi solution comprising F and As.

In most cases the second venturi slime will mainly contain Bi and some Sb and Pb. The third process gas will, during this stage, contain only minor amounts of F and As and other dissolvable species, which means that the solution is low in metal ions as compared to the first process stage.

In step (i) virtually all metals present except silver, gold, and platinum-group metals are oxidized and after step (i) the third metal phase preferably comprises less than 0.01% w/w Pb, Sb, and Bi and comprises mostly doré. The term "doré" as used herein and hereafter refers to metal alloy generally containing silver, gold, and platinum-group metals Typically doré contains 0.5 to 5% w/w Au, 0.1 to 1% w/w platinum-group metals, and the balance Ag.

The obtained third metal phase can be further refined with help of fluxes in order to remove the possibly remaining Se and Te to an amount less than 0.01% w/w to obtain a fourth metal phase and a refining slag. The refining slag can be recycled to smelting step (b).

The second converting slag comprising Bi can be smelted in a smelted and reduced in a smelting furnace in the presence of coke breeze and pyrite to obtain crude bismuth and a copper matte. The thus obtained reduced slag can be recycled back to step (g). The crude bismuth as well as the copper matte can be further refined with methods known to a person skilled in the art.

The method of the present invention may further comprise the step of: (l) diluting the remaining part of the sixth venturi solution with process water to obtain a diluted venturi solution and recycling the thus obtained diluted venturi solution to the cleaning step (f) as a part of the fifth venturi solution.

The method of the present invention may still further comprise the step of: (m) buffering the seventh venturi solution and recirculating the thus obtained buffered venturi solution to the cleaning step (c) as a part of the first venturi solution.

The filtering of the sixth venturi solution in step (k) is preferably accomplished after a new cycle of the first cleaning stage has been started. This means that the first circulation tank (106) is occupied and the seventh venturi solution cannot be transferred directly from filtering step (k) to the first circulation tank (106). Therefore there a buffering step (m) may be required. If there is enough time between the cycles there is no need of buffering.

Figure 2:
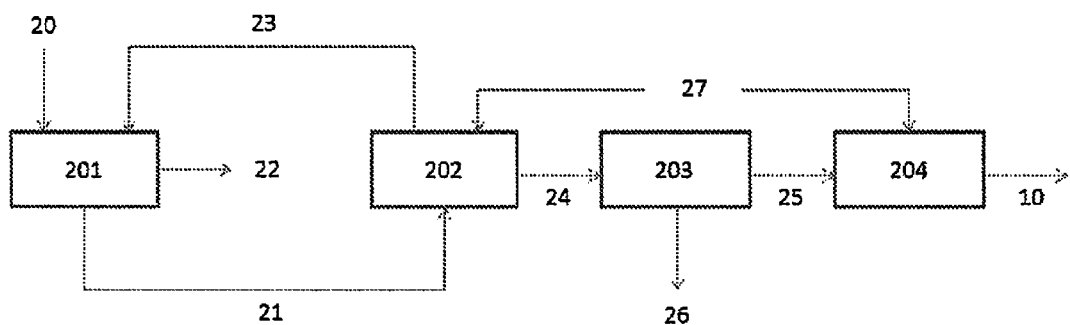
FIG. 2 shows a flow diagram of an example of second cleaning stage comprising steps (j) to (m) of the method of the present invention.

FIG. 2 illustrates an example of a second cleaning stage, comprising the steps (j) to (m) of the method of the present invention, wherein a second combined process gas (20) comprising low amounts of F and As, and consisting of a third process gas (28) produced in a second conversion step (i) and, optionally, a fourth process gas (29) produced in a slag refining step (304) as discussed above and below, is introduced into a second venturi gas cleaning step (201) wherein the second combined process gas (20) is scrubbed by contacting it with a fifth venturi solution (23) in a venturi scrubber. The second combined process gas (20) is preferably first quenched with the fifth venturi solution (23) in a quencher before introduction into the gas scrubber.

The venturi scrubber can be complemented with a droplet separator to remove the fine liquid droplets generated by the venturi gas induced liquid atomization. The fifth venturi solution (23) may comprise low amounts of F and As as discussed above. The second venturi gas cleaning step (201) provides a second cleaned process gas (22) at least partly depleted of Sb, F and As and a sixth venturi solution (21) comprising removed part of Sb, F and As which can be collected in a second holding tank (202) where it can be diluted with process water (27) for regenerating the fifth venturi solution (23). Part of the sixth venturi solution (24) separated either before the dilution with process water or after it, is filtered (203), preferably continuously, in order to remove the solid particles comprising Sb, and Pb, if present. F and As are still dissolved. Thus a second venturi slime (26) comprising Sb and a seventh venturi solution (25) comprising F and As are obtained. The seventh venturi solution (25) can be diluted in a buffer tank (204) with process water (27) and then the thus obtained buffered venturi solution (10) can be sent to the first cleaning stage to be utilized as a part of the first venturi solution (11).

The method of the present invention may further comprise the step of: (n) recycling the second venturi slime to the smelting step (b). The second venturi slime typically comprises some amounts of valuable metals, such as Bi, Sb, and/or precious metals, etc. In order to increase the recovery of the same recycling is favourable.

It was surprisingly found out that it's advantageous to collect the first venturi slime in a separate static filter press after the first cleaning stage and then use fresh process water for the second cleaning stage in order to minimize the influence from corrosive solution in the quencher and venturi throat during the second cleaning stage. However, it is possible to use fresh process water also from the beginning of the first cleaning stage. But, should the system with precipitation of F/As-compounds for any reason will fail, it's more advantageous to use fresh water after the first cleaning stage.

Figure 3:
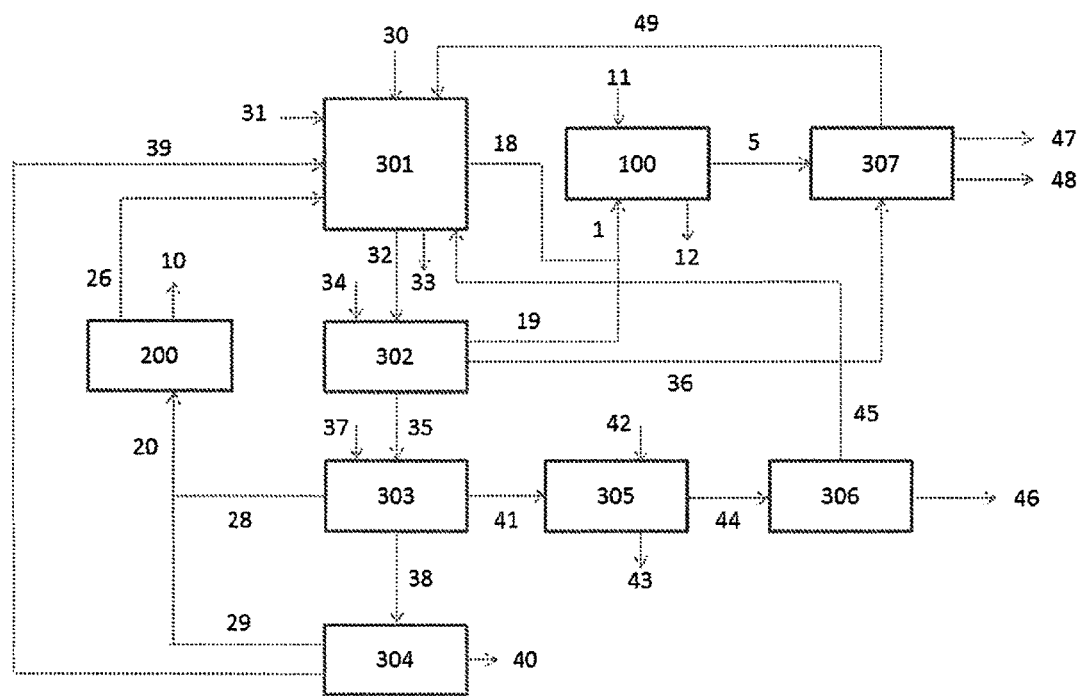
FIG. 3 shows a flow diagram of a first example of the method of the present invention.

FIG. 3 shows a first example of the method of the present invention. In FIG. 3, like components are designated by the same reference signs as used in FIGS. 1 and 2. Lead anode slime (30) and, optionally, recycled dust and materials recycled from downstream process steps (31) are introduced into a smelting furnace (301) to smelt the anode slime and to volatized and remove at least part of antimony (Sb), fluoride (F) and arsenic (As) comprised in the feed mixture to obtain a first metal phase (32), a Pb slag (33) and first process gas (18) comprising volatilized Sb, F and As. The first metal phase (32) is then introduced into a first converting step (302) together with air (34) to oxide, volatize and remove at least part of the remaining Sb, F and As and at least part of Pb comprised in the first metal phase to obtain a second metal phase (35), a first converting slag (36) comprising Sb and Pb, and a second process gas (19) comprising volatized Sb, F, As and Pb.

The combined first process gas (18) and second process gas (19) are then introduced into a first cleaning stage (100), which comprises the steps (c) to (f) of the method of the present invention as discussed above and in context of FIG. 1, as a first combined process gas (1) comprising high amounts of F and As. Antimony (47) can then be recovered (307) from the first venturi slime (5) comprising Sb and obtained by the first cleaning stage (100) and the first converting slag (36) comprising Sb and Pb by methods known to a person skilled in the art while a resulting Pb/Sb residue (48) is bleed out.

The second metal phase (35) is then introduced into a second converting step (303) together with air (37) to oxide, volatize and remove at least part of the remaining Sb, F and As and at least part of Pb comprised in the second metal phase to obtain a third metal phase (38), a second converting slag (41) comprising Bi, and a third process gas (28) comprising volatized Sb, F, As and Pb.

The third metal phase (38) comprising mostly doré is then further refined (304) in order to remove the possibly remaining Se and Te to an amount less than 0.01% w/w to obtain a fourth metal phase (40) and a refining slag (39). The obtained refining slag (39) can then be recycled back to smelting step (301). Silver can be recovered from the fourth metal phase (40) by methods known to a person skilled in the art, e.g. anode silver casting.

The combined third process gas (28) and fourth process gas (29) are introduced into a second cleaning stage (200), comprising the steps (j) to (m) of the method of the present invention as discussed above and in context of FIG. 2, as a second combined process gas (20) comprising low amounts of F and As. The second venturi slime (26) can then be recycled to smelting step (301) and the buffered venturi solution (10) to the first cleaning stage (100) as a part of the first venturi solution (11).

Copper is recovered from the second converting slag (41) by introducing the said slag first to a Bi converter (305) for slag reduction by contacting the said slag with coke and pyrite (42) to obtain a copper matte (43) and crude Bi (44). Bismuth (46) is then recovered (306) from the crude bismuth (44) by methods known to a person skilled in the art: The residue (45) can be recycled to the smelting step (301).

In accordance with the present invention the lead anode slime comprised in the feed mixture typically comprises antimony, fluoride, arsenic and bismuth, in particular the lead anode slime comprises from 25 to 50% w/w Sb, from 0.5 to 5% w/w F, from 0.2 to 10% w/w As, and from 0.2 to 20% w/w Bi.

The feed mixture may contain only lead anode slime or it may further comprise recycled dust and/or materials recycled from downstream process steps.

The feed mixture is preferably added to the smelting step (b) in portions. Advantageously the feed mixture is heated before being smelted. The smelting furnace is preferably rotated during heating and smelting. The temperature is raised above 1000° C. allowing the feed mixture to be smelted and at least part of the Sb to be volatized. Preferably the temperature is from 1150 to 1200° C. Too high temperature increases the ware of the brick lining. Further, increased vapor pressure results in that more fumes containing Pb, As and F will be vaporized from the melt to the gas cleaning. Preferably those elements should as far as possible be collected in the smelt slag in order to minimize the formation of filter cakes in the gas cleaning system.

In a preferred example of the smelting step (b) of the present invention coke breeze is added to the smelting step (b) after smelting of the feed mixture. The term "coke breeze" as used herein and hereafter refers to fine coke separated by screening from the larger sizes before or after crushing. It typically has a size less than 12 mm. The addition of coke breeze to the smelting step completes the reduction of the metals in the smelt and thus the metal oxides in the slag that are most easily reduced will form very small metal droplets that will collect most of remaining Ag during settling through the slag. This will increase the direct recovery of Ag. Oxides of Sb and Bi are an example of easily reduced metal oxides. Thus the addition of coke breeze also enhances the direct recovery of Sb and Bi. Keeping the temperature above 1000° C. at this stage prevents the formation of foaming slag. Coke breeze is advantageously added in small portions.

It will be obvious to a person skilled in the art that, as the technology advances, the inventive concept can be implemented in various ways. The invention and its embodiments are not limited to the examples described above but may vary within the scope of the claims.

The invention claimed is:

1. A method of treating lead anode slime, comprising the steps of:
   (a) providing a feed mixture comprising lead anode slime;
   (b) smelting the feed mixture in a smelting furnace at a temperature above 1000° C. to smelt the feed mixture and to volatilize and remove at least part of antimony (Sb), fluorine (F) and arsenic (As) comprised in the feed mixture to obtain a first metal phase, a lead (Pb) slag and first process gas comprising volatilized Sb, F and As;

(c) cleaning the obtained first process gas in a venturi scrubber by contacting the said first process gas and a first venturi solution in the venturi scrubber to remove at least part of the Sb, F and As from the said first process gas to obtain a first cleaned process gas at least partly depleted of Sb, F and As and a second venturi solution comprising removed part of Sb, F and As;

(d) filtering at least part of the obtained second venturi solution to obtain a first venturi slime comprising Sb and a third venturi solution comprising F and As;

(e) adding a precipitation agent to the third venturi solution to precipitate at least part of F and As and filtering the precipitate to obtain a fourth venturi solution at least partly depleted of F and As and a F/As precipitate; and (f) recycling the obtained fourth venturi solution to step (c) as a part of the first venturi solution.

2. The method as claimed in claim 1, wherein the method further comprises the steps of:

(g) subjecting the first metal phase obtained in step (b) to oxidizing conditions to oxidize, volatilize and remove at least part of the remaining Sb, F and As and at least part of Pb comprised in the first metal phase to obtain a second metal phase, a first converting slag comprising Sb and Pb, and a second process gas comprising volatilized Sb, F, As and Pb; and (h) introducing the obtained second process gas to the cleaning step (c).

3. The method as claimed in claim 2, wherein the method further comprises the steps of:

(i) subjecting the second metal phase obtained in step (g) to oxidizing conditions to oxidize, volatilize and remove at least part of the remaining Sb, F and As and at least part of Pb comprised in the second metal phase to obtain a third metal phase, a second converting slag comprising bismuth (Bi), and a third process gas comprising volatilized Sb, F, As and Pb;

(j) cleaning the obtained third process gas in a venturi scrubber by contacting the said third process gas and a fifth venturi solution in the venturi scrubber to remove at least part of the Sb, F and As from the said the said process gas and to obtain a second cleaned process gas at least partly depleted of Sb, F and As and a sixth venturi solution comprising Sb, F and As; and (k) filtering part of the obtained sixth venturi solution to obtain a second venturi slime comprising Sb and a seventh venturi solution comprising F and As.

4. The method as claimed in claim 3, wherein the method further comprises the step of:

(l) diluting the remaining part of the sixth venturi solution with process water to obtain a diluted venturi solution and recycling the thus obtained diluted venturi solution to the cleaning step (f) as a part of the fifth venturi solution.

5. The method as claimed in claim 3, wherein the method further comprises the step of:

(m) buffering the seventh venturi solution and recirculating the buffered venturi solution to the cleaning step (c) as a part of the first venturi solution.

6. The method as claimed in claim 3, further comprising the steps of:

(n) recycling the second venturi slime to the smelting step (b).

7. The method as claimed in claim 2, wherein step (g) is accomplished by exposing the first metal phase to air.

8. The method as claimed in claim 1, wherein the lead anode slime comprises 25 to 50% w/w Sb, from 0.5 to 5% w/w F and from 0.2 to 10% w/w As, and optionally from 0.2 to 20% w/w bismuth (Bi).

9. The method as claimed in claim 1, wherein step (b) further comprises adding coke breeze to the smelting furnace after smelting of the feed mixture at a temperature above 1000° C. to complete the reduction of the obtained smelt.

10. The method as claimed in claim 1, wherein feed mixture is added to the smelting step (b) in portions.

11. The method as claimed in claim 1, wherein temperature of step (b) is from 1150 to 1200° C.

12. The method as claimed in claim 1, wherein the precipitation agent in step (e) is calcium oxide (CaO), calcium hydroxide (Ca(OH)$_2$), calcium carbonate (CaCO$_3$) or a mixture thereof.

13. The method as claimed in claim 1, wherein the feed mixture further comprise recycled dust and/or materials recycled from downstream process steps.

* * * * *